United States Patent
Zhang et al.

(10) Patent No.: US 9,459,947 B2
(45) Date of Patent: *Oct. 4, 2016

(54) ERROR REPORT PROCESSING USING CALL STACK SIMILARITY

(71) Applicant: Microsoft Technology Licensing, LLC., Redmond, WA (US)

(72) Inventors: Dongmei Zhang, Bellevue, WA (US); Yingnong Dang, Beijing (CN); Song Ge, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,267

(22) Filed: Jan. 12, 2015

(65) Prior Publication Data

US 2015/0127990 A1   May 7, 2015

Related U.S. Application Data

(63) Continuation of application No. 12/957,090, filed on Nov. 30, 2010, now Pat. No. 8,949,675.

(51) Int. Cl.
*G06F 11/00* (2006.01)
*G06F 11/07* (2006.01)

(52) U.S. Cl.
CPC ....... *G06F 11/0781* (2013.01); *G06F 11/0775* (2013.01); *G06F 11/0778* (2013.01); *G06F 11/0787* (2013.01)

(58) Field of Classification Search
None
See application file for complete search history.

(56) References Cited

U.S. PATENT DOCUMENTS

| | | | |
|---|---|---|---|
| 5,928,369 A | 7/1999 | Keyser et al. | |
| 6,266,788 B1 | 7/2001 | Othmer et al. | |
| 7,614,043 B2 | 11/2009 | Ognev et al. | |
| 7,890,814 B2 | 2/2011 | Zhang et al. | |
| 8,032,866 B1 | 10/2011 | Golender et al. | |
| 2003/0005414 A1 | 1/2003 | Elliott et al. | |
| 2004/0078689 A1 | 4/2004 | Knuutila et al. | |
| 2005/0120273 A1 | 6/2005 | Hudson et al. | |
| 2005/0289404 A1 | 12/2005 | Maguire | |

(Continued)

OTHER PUBLICATIONS

Brodie et al., "Automated Problem Determination Using Call-Stack Matching", Jun. 2005, Journal of Network and Systems Management, vol. 13, No. 2.*

(Continued)

*Primary Examiner* — Gabriel Chu
(74) *Attorney, Agent, or Firm* — Sandy Swain; Micky Minhas; Lee & Hayes, PLLC

(57) ABSTRACT

Techniques for error report processing are described herein. Error reports, received by a developer due to program crashes, may be organized into a plurality of "buckets." The buckets may be based in part on a name and a version of the application associated with a crash. Additionally, a call stack of the computer on which the crash occurred may be associated with each error report. The error reports may be "re-bucketed" into meta-buckets to provide additional information to programmers working to resolve software errors. The re-bucketing may be based in part on measuring similarity of call stacks of a plurality of error reports. The similarity of two call stacks—a measure of likelihood that two error reports were caused by a same error—may be based in part on functions in common, a distance of those functions from the crash point, and an offset distance between the common functions.

22 Claims, 14 Drawing Sheets

(56) References Cited

U.S. PATENT DOCUMENTS

| | | |
|---|---|---|
| 2006/0150163 A1 | 7/2006 | Chandane |
| 2007/0283338 A1 | 12/2007 | Gupta et al. |
| 2008/0126325 A1 | 5/2008 | Pugh et al. |
| 2009/0006883 A1 | 1/2009 | Zhang et al. |
| 2010/0064179 A1 | 3/2010 | Champlin et al. |

OTHER PUBLICATIONS

Bartz, et al., "Finding Similar Failures Using Callstack Similarity", retrieved on Aug. 25, 2010 at <<http://www.usenix.org/event/sysml08/tech/full_papers/bartz/bartz.pdf>>, USENIX Association, Workshop on Tackling Computer Systems Problems with Machine Learning Techniques (SysML), Dec. 11, 2008, pp. 1-6.

Brodie, et al., "Quickly Finding Known Software Problems via Automated Symptom Matching", retrieved on Aug. 25, 2010 at <<http://ieeexplore.ieee.org/stamp/stamp.jsp?tp=&arnumber=1498056>>, IEEE Computer Society, Proceedings of International Conference on Autonomic Computing (ICAC), 2005, pp. 1-10.

Modani, et al., "Automatically Identifying Known Software Problems", retrieved on Aug. 25, 2010 at <<http://ccs.njit.edu/inst/source/06SMDS06.pdf>>, IEEE, Proceedings of ICDE Workshop on Self-Managing Database Systems (SMDB), Istanbul Turkey, 2007, pp. 433-441.

Office action for U.S. Appl. No. 12/957,090, mailed on Jul. 23, 2013, Dongmei Zhang et al, "Error Report Processing", 12 pages.

Office action for U.S. Appl. No. 12/957,090, mailed on Nov. 1, 2013, Zhang, et al., "Error Report Processing", 13 pages.

Office action for U.S. Appl. No. 12/957,090, mailed on May 28, 2014, Zhang et al, "Error Report Processing", # pages.

Podgurski, et al., "Automated Support for Classifying Software Failure Reports", retrieved on Aug. 25, 2010 at <<http://ieeexplore.ieee.org/stamp/stamp.jsp?tp=&arnumber=1201224>>, IEEE Computer Society, Proceedings of International Conference on Software Engineering (ICSE), Portland, Oregon, 2003, pp. 465-475.

* cited by examiner

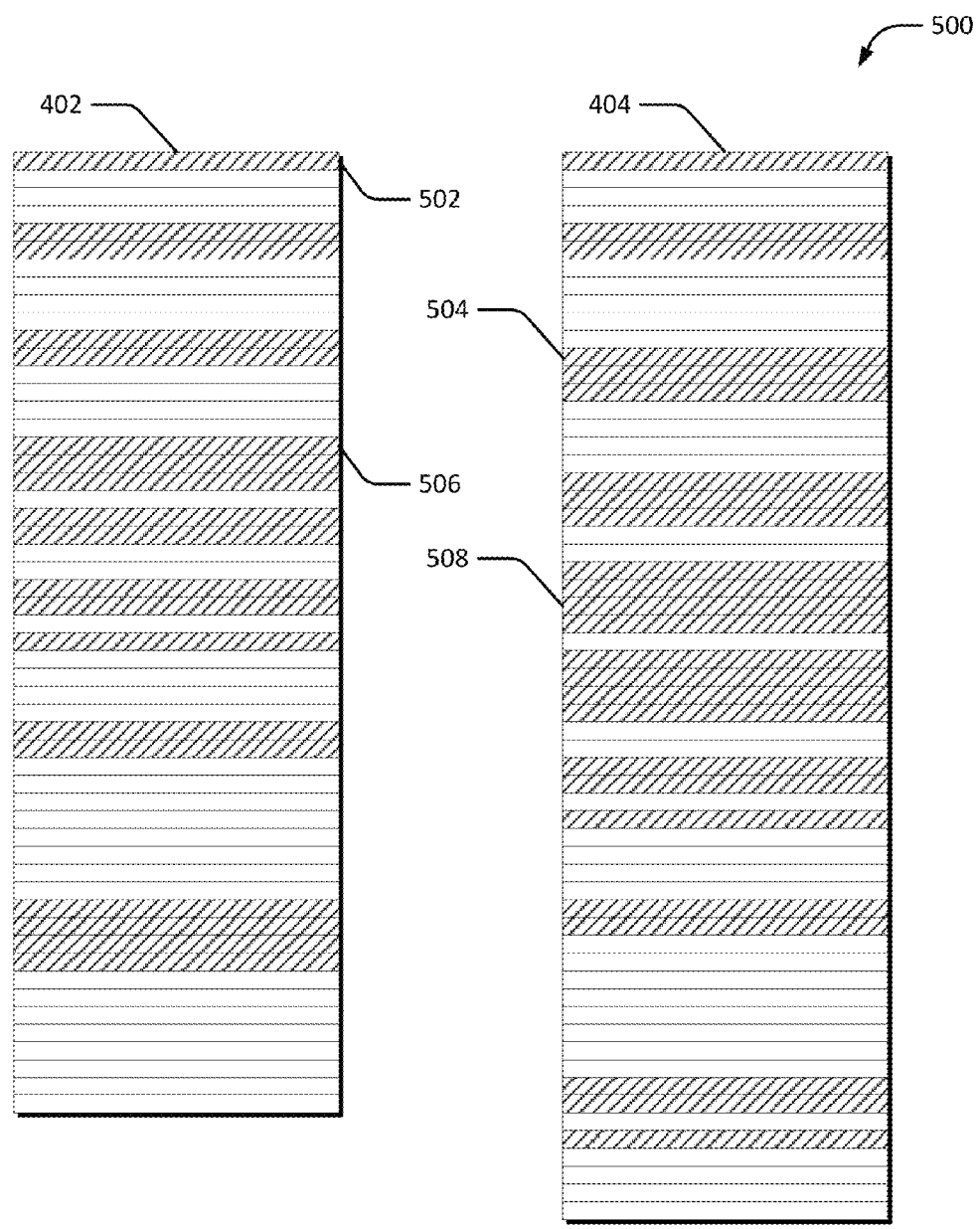
 IMMUNE FUNCTION (A CRASH IN AN IMMUNE FUNCTION IS ASSUMED TO NOT BE THE FAULT OF THE IMMUNE FUNCTION)
FIG. 5

ERROR REPORT PROCESSING USING CALL STACK SIMILARITY

RELATED APPLICATIONS

This application claims priority to and is a continuation of U.S. patent application Ser. No. 12/957,090, filed on Nov. 30, 2010, the entire contents of which are incorporated herein by reference.

BACKGROUND

In a computing environment, it is not uncommon for a program to have an error, which may result in a "crash" or "hang." Such programs may include word processing programs, office management programs or almost any type of program. Following the crash or hang, a dialog box may invite the user to send an "error report" to a software corporation.

Error reports, which may be considered "telemetry data," include information from the memory of the computer, prior to the crash. Such information is useful to software developers trying to determine a cause of the failure. In some cases, tens of millions of error reports may arrive daily.

Due to the volume of error reports which may be received by a software company, it may be difficult to process the incoming information, and particularly, to derive useful insight as to the cause of error reports. This difficulty is magnified because error reports are not grouped logically and in a manner which suggests a cause of the underlying error.

Thus, advancements in error report processing would be welcome, particularly advancements able to more efficiently process very large numbers of error reports. Additionally, advancements in error report processing that are able to better analyze error reports, and particularly to indicate software problems in less common error reports, would result in more rapid error detection.

SUMMARY

Techniques for error report processing are described herein. In one example, large numbers of error reports, organized according to "buckets," are received due to program crashes. The error reports can be re-bucketed into meta-buckets, which can be based on a similarity of call stacks associated with each error report. The meta-buckets can be used to provide output to programmers analyzing the software errors.

In a further example, error reports received by a developer due to program crashes may be organized into a plurality of "buckets" based in part on a name and a version of the application associated with a crash. The error reports may also include a call stack of the computer on which the crash occurred. The call stacks of the error reports may be used to "re-bucket" the error reports into meta-buckets. Organization of error reports in meta-buckets may provide a deeper insight to programmers working to resolve software errors. The re-bucketing may cluster together error reports based in part on a similarity of their call stacks. The similarity of two call stacks may be based on a number of factors, including a model described herein. Further, call stack similarity may be based in part on functions or subroutines on two call stacks, a distance of those functions or subroutines from the crash point, and an offset distance between the common functions or subroutines.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 5 is a diagram illustrating an example of two call stacks, and also showing how immune functions may be distributed in call stacks.

DETAILED DESCRIPTION

Figure 1:
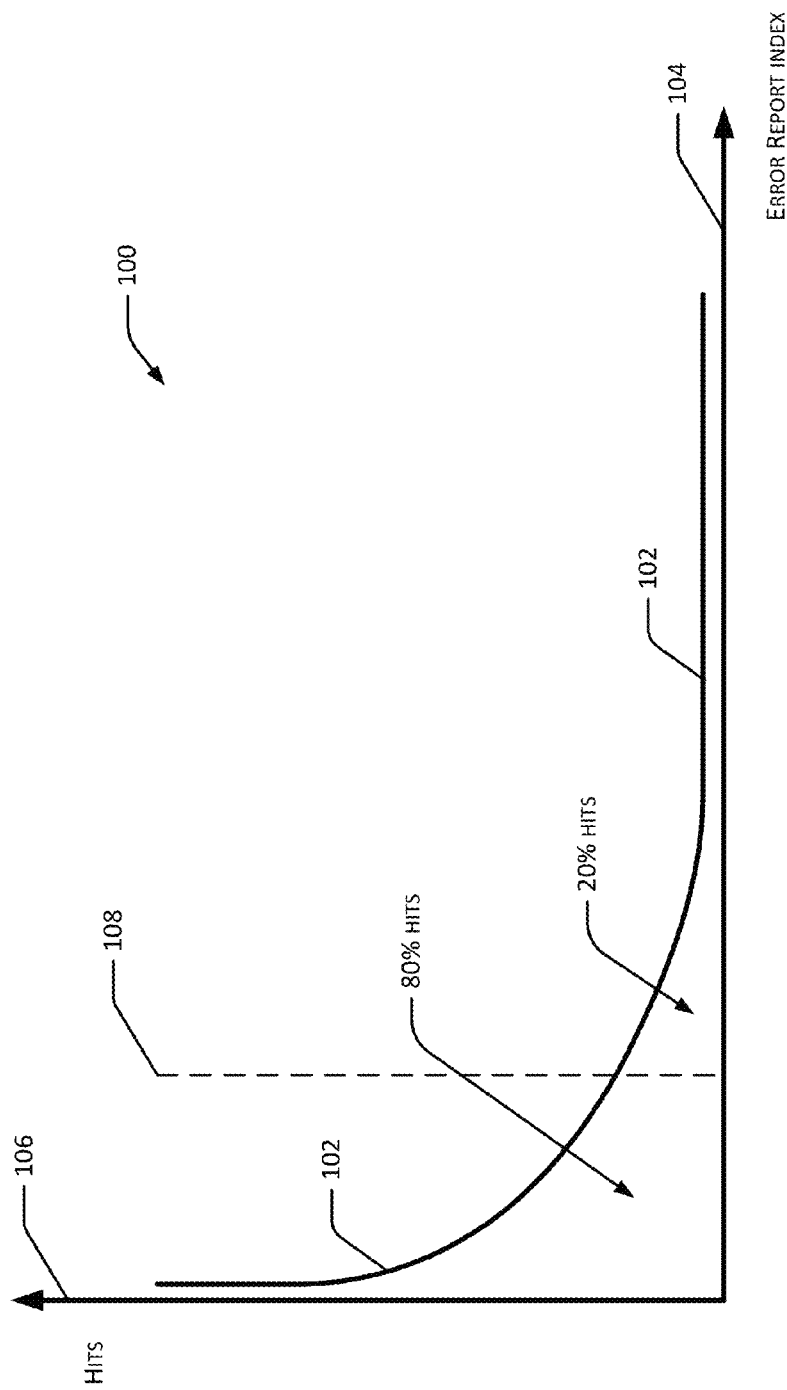
FIG. 1 is a graph illustrating an example of error reports distributed among buckets.

Techniques for error report processing are described herein. In one example, large numbers of error reports, organized according to "buckets," are received due to program crashes. The error reports can be re-bucketed into meta-buckets, which can be based on a similarity of call stacks associated with each error report. The meta-buckets can be used to provide output to programmers analyzing the software errors.

In a further example, error reports received by a developer due to program crashes may be organized into a plurality of "buckets" based in part on a name and a version of the application associated with a crash. The error reports may also include a call stack of the computer on which the crash occurred. The call stacks of the error reports may be used to "re-bucket" the error reports into meta-buckets. Organization of error reports in meta-buckets may provide a deeper insight to programmers working to resolve software errors.

The re-bucketing may cluster together error reports based in part on a similarity of their call stacks. The similarity of two call stacks may be based on a number of factors, including a model described herein. Call stack similarity may be based in part on functions or subroutines common to the two call stacks, a distance of those functions or subroutines from a crash point, an offset distance between the common functions or subroutines and/or other factors.

The techniques discussed herein improve error report processing by increasing a likelihood that related errors are clustered together in meta-buckets. Additionally, the techniques discussed herein provide a stack similarly model that effectively clusters error reports by providing a measure of call stack similarity. Additionally, the techniques discussed herein provide for model training, wherein parameters used by the model are adjusted to allow better measurement of a similarity between call stacks associated with two error reports.

The discussion herein includes several sections. Each section is intended to be non-limiting. More particularly, this entire description is intended to illustrate components which may be utilized in error report processing, but not components which are necessarily required. The discussion begins with a section entitled "Example Techniques in Error Reporting and Call Stack Similarity," which describes error reports and techniques for measuring similarity between call stacks associated with different error reports. Next, a section entitled "Example Techniques for Objective Call Stack Similarity Measurement" illustrates and describes techniques that can be used to objectively measure similarity between call stacks. Next, a section entitled "Example Error Report Processing System" illustrates and describes techniques that can be used to process error reports, measure similarity between call stacks and to provide output to software developers and programmers. A fourth section, entitled "Example Flow Diagrams" illustrates and describes techniques that may be used in error reporting and in measurement of call stack similarity. Finally, the discussion ends with a brief conclusion.

This brief introduction, including section titles and corresponding summaries, is provided for the reader's convenience and is not intended to limit the scope of the claims or any section of this disclosure.

Example Techniques in Error Reporting and Call Stack Similarity

FIG. 1 is a graph 100 illustrating an example distribution of error reports along curve 102. Each error report resulted from a significant program error that was reported by a user. Each error report may be associated with the name of an application in which the error occurred (e.g., a computer program, such as a word processing program), and placed in an appropriate position along the "error report index," i.e., the horizontal axis 104 of the graph 100. A vertical axis 106 is associated with "hits," and indicates numbers of error reports associated with a particular error report index. The distribution 102 shows that large numbers of error reports are similar (the left side of the graph), and other error reports are less commonly occurring. In an arbitrary example, a vertical line 108 divides a more common 80% of the error reports from less common 20% of the error reports. It is important to note, however, that significant software errors may be associated with error reports seen to the right of line 108. However, such error reports may more difficult to associate with specific software faults. In some instances, this is because more different-looking error reports are associated with a single error than is typically the case. Accordingly, such errors may be more difficult to resolve than error reports associated with frequent hits, to the left of line 108.

Figure 2:
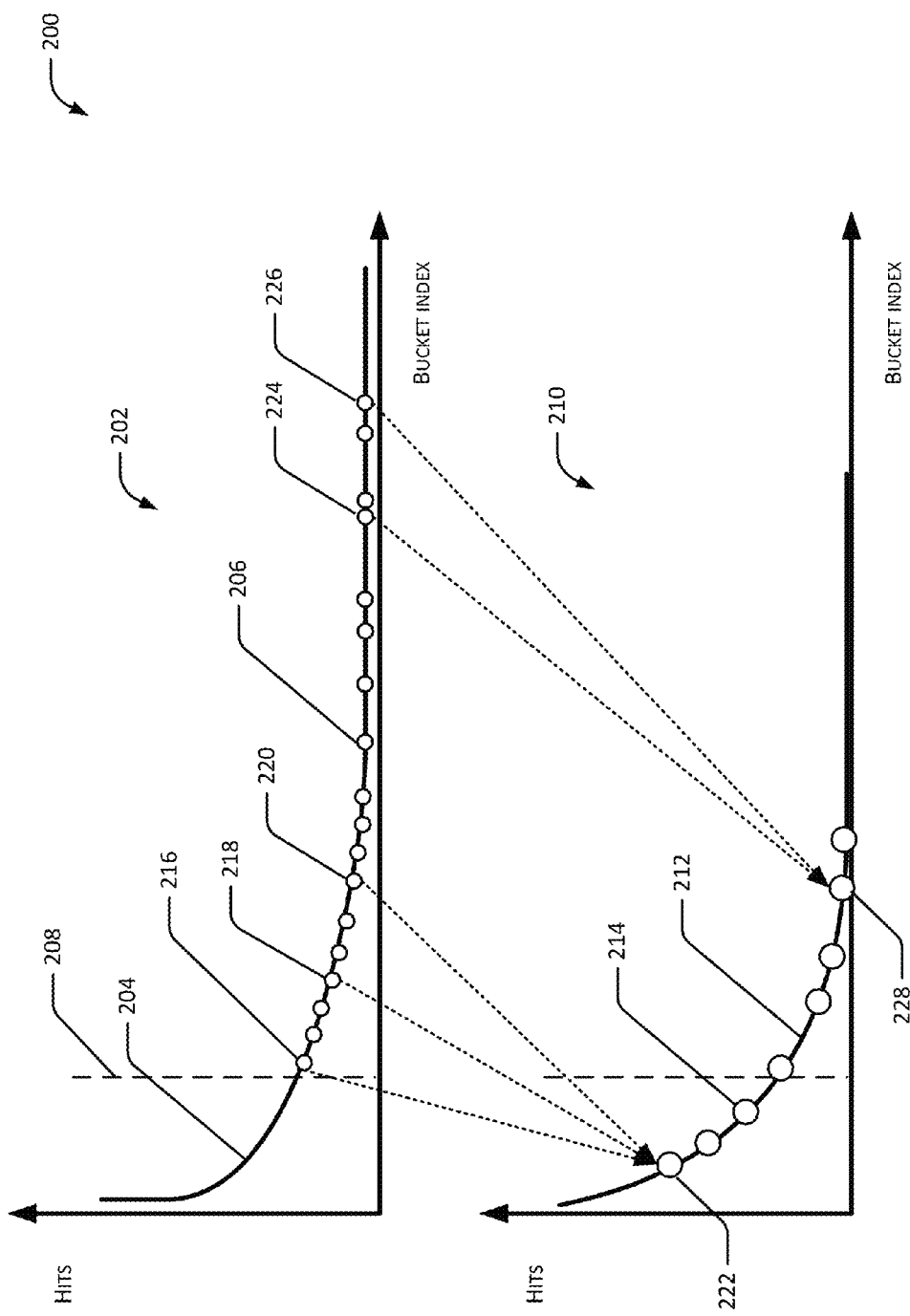
FIG. 2 is a diagram illustrating an example of a relationship between buckets and meta-buckets.

FIG. 2 is a diagram 200 illustrating an example of a relationship between "buckets" and "meta-buckets." Buckets are groupings of error reports derived from a common software application or program, perhaps having a same version number. As will be described below, meta-buckets are groupings of error reports calculated to provide additional assistance to software programmers investigating error reports. A graph 202 illustrates an example distribution 204 of buckets, particularly focusing on the tail buckets (e.g., tail bucket 206) to the right of arbitrary divider 208. The tail buckets 206 represent buckets that receive fewer hits than head buckets (buckets, not shown, but located on curve 204 to the left of the line 208).

A graph 210 illustrates an example distribution 212 of meta-buckets (e.g., meta-bucket 214). Each meta-bucket may be formed by clustering two or more error reports obtained from buckets 206 of the graph 202. The clustering may be based on a similarity of the error reports. In particular, the similarity may be based on a similarity of a first call stack associated with a first error report to a second call stack associated with a second error report. Thus, if the call stacks are sufficiently similar, then the associated error reports may be combined into a same meta-bucket. Thus, each meta-bucket may include error reports that are based on similarity of call stacks in the error reports, and generally, based on similarity of an underlying error. In contrast, the buckets (e.g., bucket 206) may include error reports related to a same application and/or version thereof, but which may concern different errors.

FIG. 2 provides an example of a re-bucketing and/or clustering process that groups error reports in a more productive manner. In one example, the error reports are re-bucketed based on call stack similarity, to group error reports having similar call stacks in a same meta-bucket. Referring to the example of FIG. 2, error reports from buckets 216-220 have been evaluated, found to have similar call stacks, and placed in a meta-bucket 222. Similarly, error reports from buckets 224, 226 have been evaluated, found to have similar call stacks, and placed in meta-bucket 228.

Figure 3:
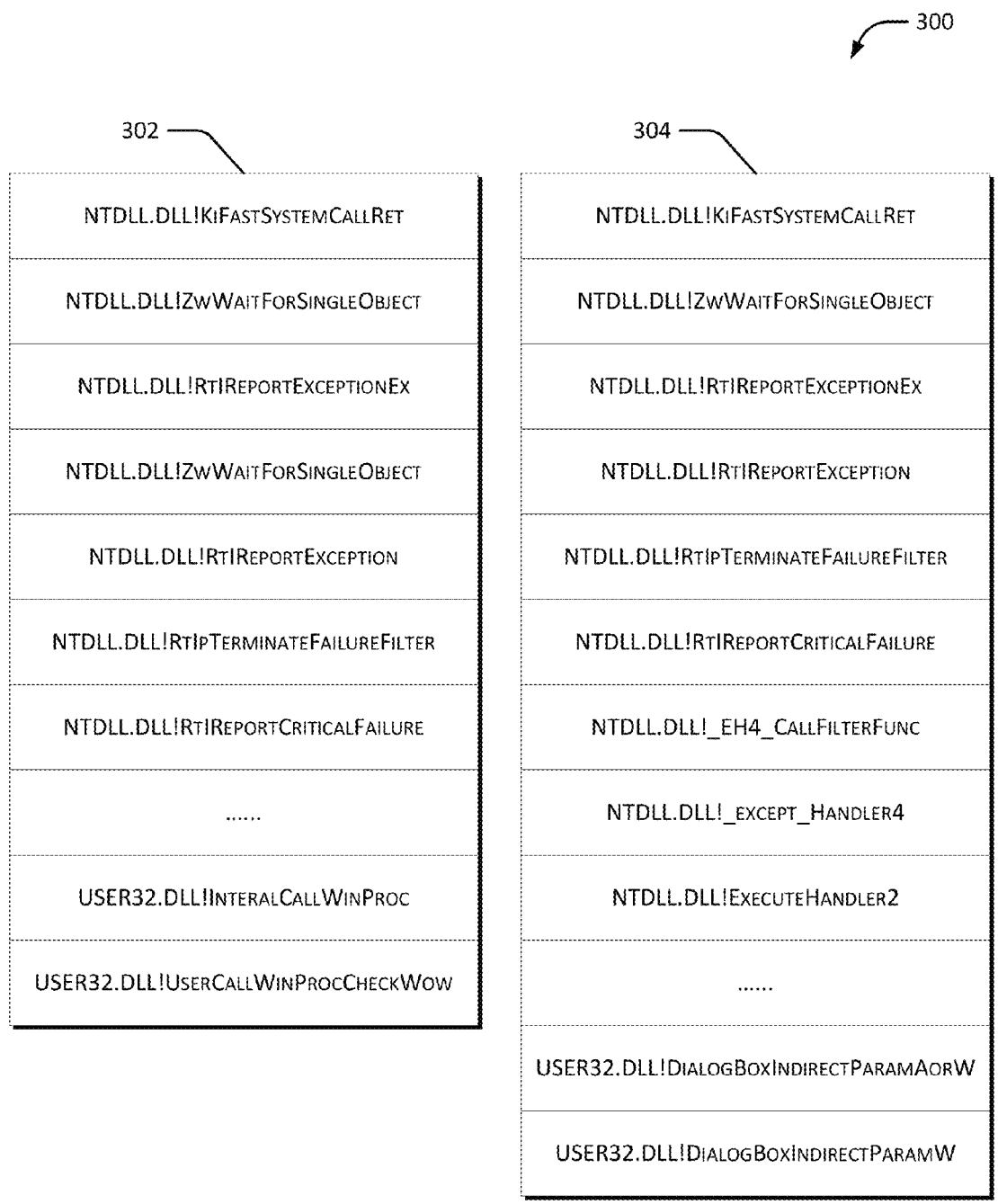
FIGS. 3 and 4 are diagrams, each diagram illustrating an example of two call stacks, each call stack associated with an error report.

FIG. 3 is a diagram 300 illustrating an example of two call stacks 302, 304 associated with two error reports. The call stacks 302, 304 are essentially a list of "calls" to procedures, functions and/or subroutines. Such calls can be the name of the procedure and/or an address of, or pointer to, a procedure. Therefore, the call stacks 302, 304 can be considered a partial record of what a computer was doing before a software error and/or crash occurred.

Examination of the call stacks 302, 304 indicates that some of the procedures are the same and some are different. For example, the first three procedures are the same in both call stacks 302, 304. However, the fourth procedure in call stack 304 is in the fifth position in call stack 302. The last procedure in call stack 302 is not seen in call stack 304. Accordingly, there are both similarities and differences in the two call stacks. The below discussion will be directed in part to a determination of whether the error reports associated with two such call stacks, having both similarities and differences, should be combined into a same meta-bucket.

Figure 4:
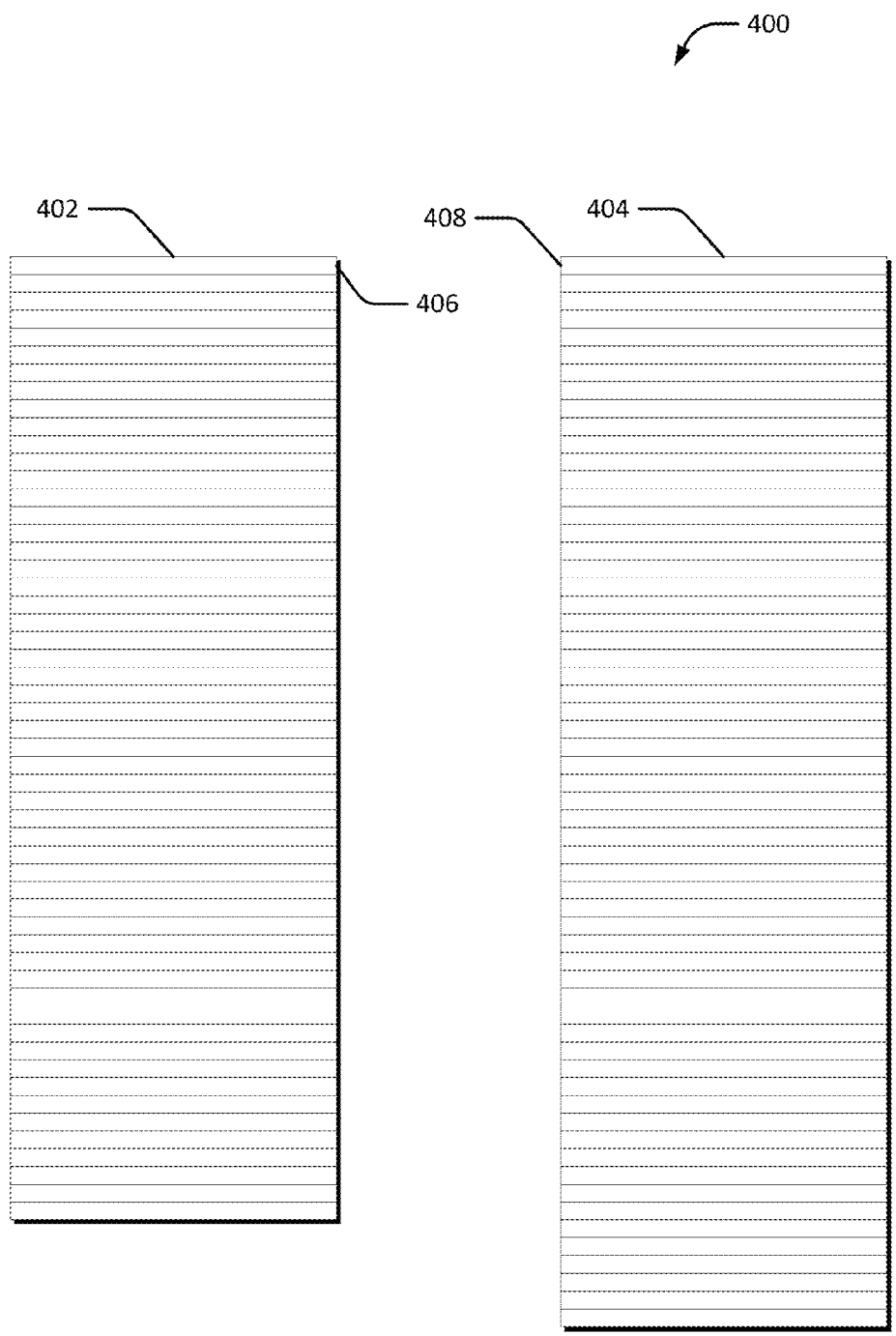

FIG. 4 is a second diagram 400 illustrating an example of the two call stacks 402, 404 associated with two error reports. Both call stacks 402, 404 include a plurality of horizontal boxes, each representing a procedure or subroutine that was called during a period of time before a software error and/or crash. Such a function or procedure may be considered a crash point. Note that the top horizontal box 406, 408 in each call stack 402, 404, respectively, indicates a last procedure that was called before the crash. It is possible that this procedure caused the crash. However, it is also possible that a previous procedure has caused a problem—such as alteration of memory outside of its allocated region—that actually created damage that caused the crash to occur at a later time. Accordingly, FIG. 4 is a starting point for an analysis that is carried forward in FIGS. 5-8.

FIG. 5 is a diagram 500 illustrating the two call stacks 402, 404 of FIG. 4, after immune functions have been marked. Immune functions are functions, procedures and/or subroutines that are considered to be "immune" from fault and/or blame in the event of a software error and/or crash Immune functions may include those functions that are simple enough, and/or have been used successfully long enough, that it is unlikely that the function is flawed. Identification of immune functions is advantageous, in that it is a step that eliminates some of the uncertainty of finding a software error or bug. By eliminating the immune functions, the software engineers and programmers can concentrate on other areas within which a fault is more likely located. In the example of FIG. 5, a plurality of immune functions (e.g., immune functions 502-508) is located within the call stacks 402, 404.

Figure 6:
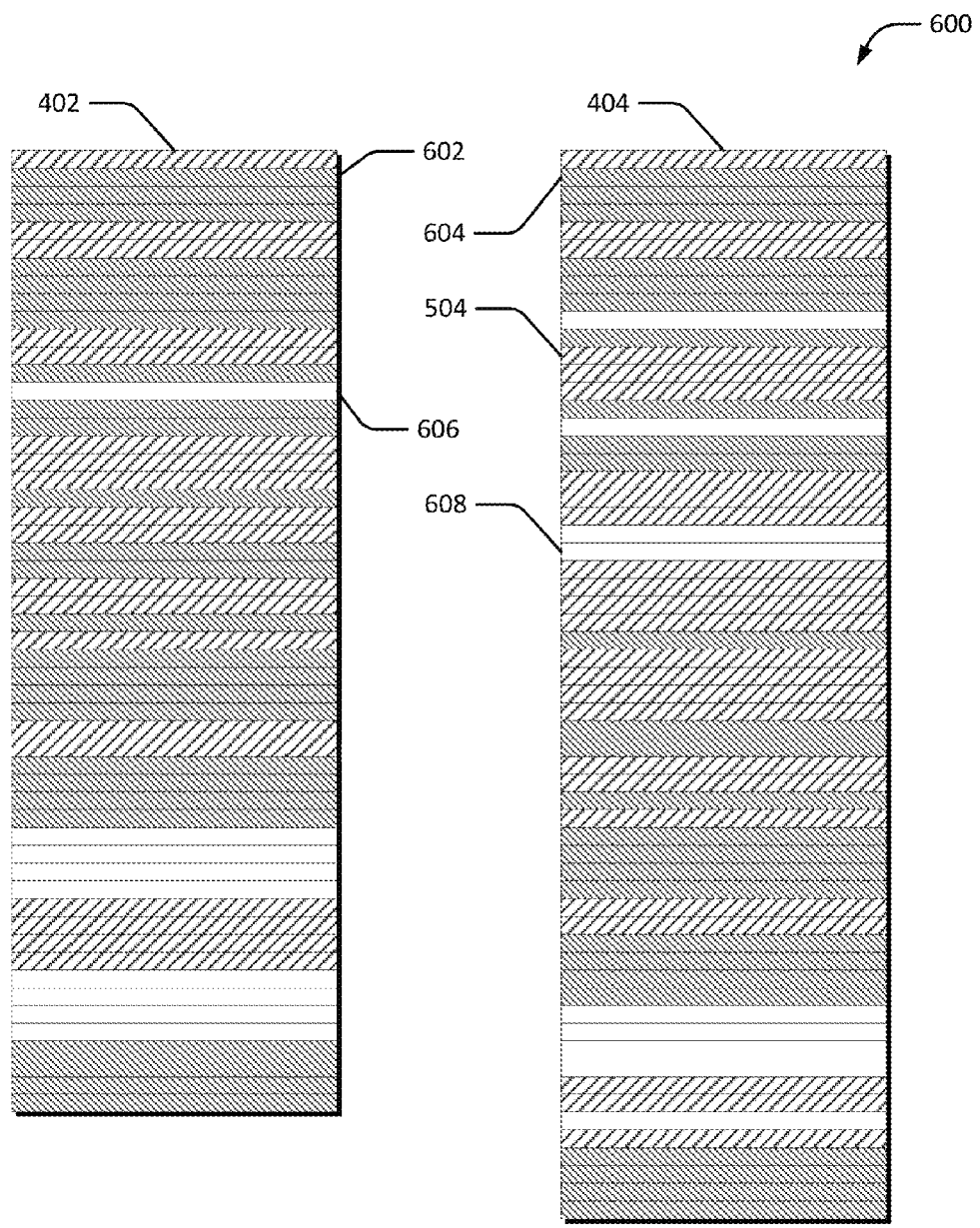
FIG. 6 is diagram illustrating an example of how matched functions may be distributed in the call stacks.

FIG. 6 is diagram 600 illustrating an example of how matched functions may be distributed in the call stacks. Matched functions are calls, in a first call stack, to functions, procedures and/or subroutines that are "matched" by a call to a same function, procedure and/or subroutine in a second call stack. Thus, matched functions 602, 604 in call stacks 402, 404 are calls to a same function, and are therefore "matched." As will be seen in FIG. 7, matched functions do not have to be located in a similar place in the call stack. However, if they are located in a similar place in the call stack, it is more likely that the call stacks (and therefore the associated error reports) are related to a same software error or bug.

FIG. 6 also introduces the concept of "other functions." Two "other functions" 606, 608 are seen in call stacks 402, 404. An "other function" is a function that is not an immune function, and is also not matched to a same function in the other call stack. Thus, other functions 606, 608 in call stack 402, 404 are not matched to a same function in the other call stack. The more "other functions" that are present in the call stacks, the less likely it is that the call stacks, and their associated error reports, are associated with a same software error, bug or crash.

Figure 7:
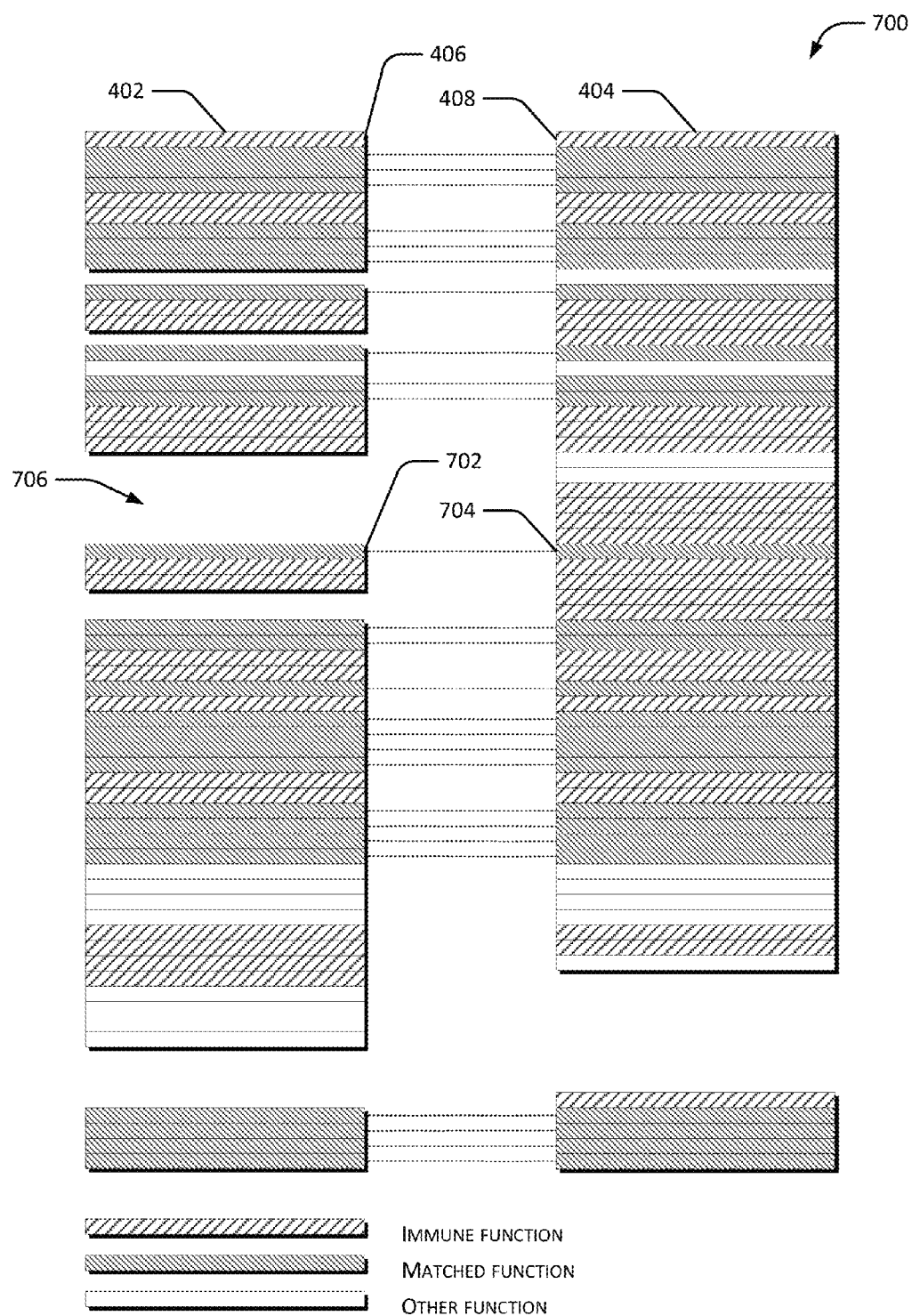
FIG. 7 is a diagram illustrating an example of aspects of alignment of matched functions within two call stacks.

FIG. 7 is a diagram 700 illustrating an example of aspects of alignment of matched functions within two call stacks 402, 404. The alignment of matched functions is seen graphically in diagram 700. In the example of FIG. 7, matched functions 702 and 704 are aligned by movement of portions of call stack 402, and insertion of a space 706 to result in the alignment. By aligning the matched functions, the offset between two functions can be determined.

Alternatively, the alignment offset can be determined by calculation. The offset can be determined by measuring a distance, in each call stack, from each of two matched functions to the procedure that was operating when the crash occurred (e.g., the crash at procedures 406, 408), and subtracting those distances, to obtain the offset. The number of immune functions between a matched function and the procedure that was operating when the crash occurred may be removed when measuring the distance to the crash. The difference, obtained by subtraction of these distances is the offset.

Figure 8:
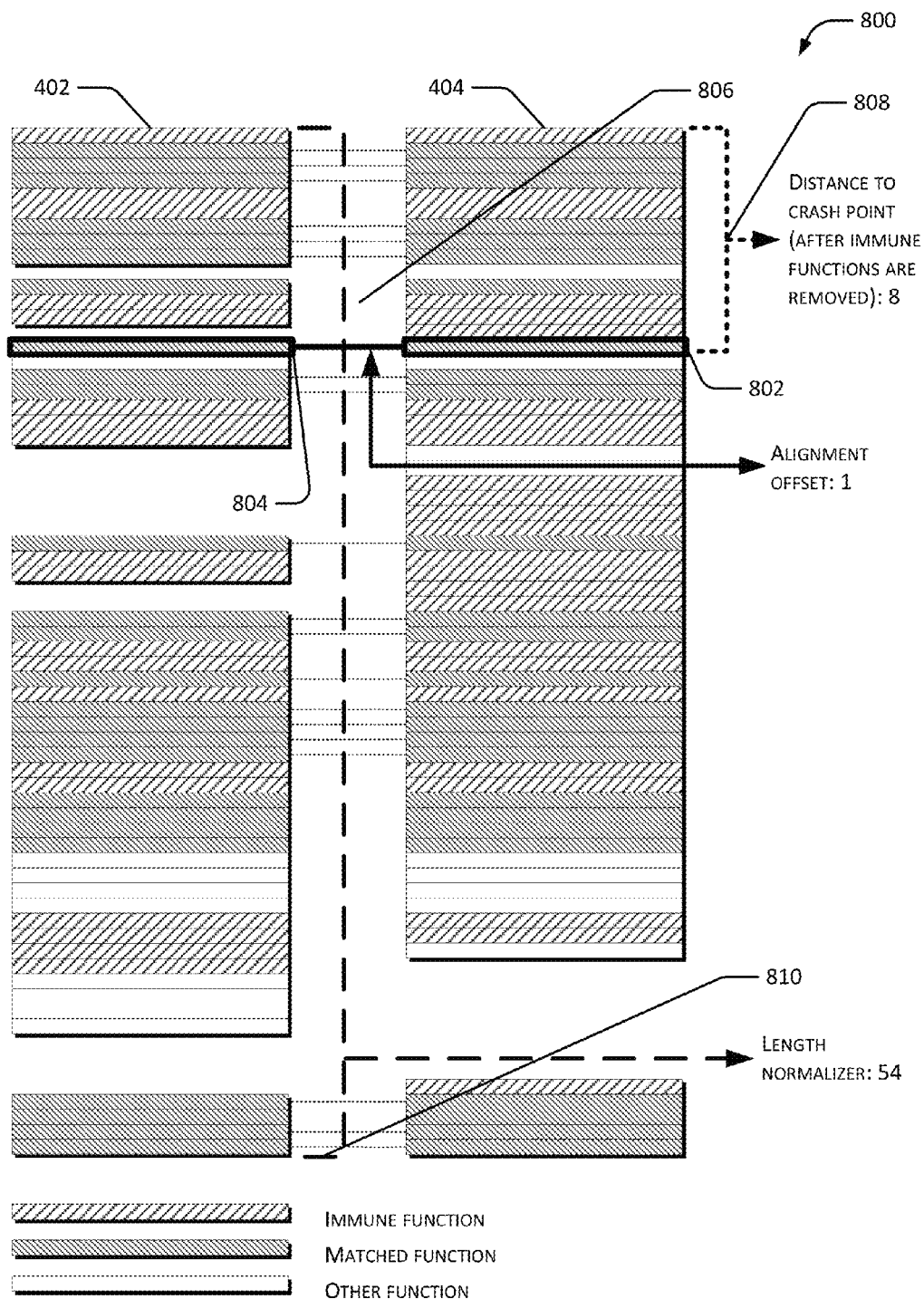
FIG. 8 is a diagram illustrating an example of aspects of function distance to crash point, function alignment offset and call stack length normalization.

FIG. 8 is a diagram 800 illustrating examples of function alignment offset, distance to crash point and call stack length normalization. In FIG. 8, the call stacks 402, 404 have been aligned, so that matched functions (e.g., matched functions 802, 804) are aligned. The alignment process results in an offset value for each matched pair of functions. For example, the offset 806 between the matched pair of functions 802, 804 is one (1). That is, the function 804 is one (1) function closer to the top of the stack (the crash point) than the function 802.

The details of offset calculation may be understood with reference to FIG. 8. The function 802 is a distance of eight (8) functions from the "crash point," i.e., the top function of the stack 404. The distance of eight functions is the total of fourteen functions, minus six immune functions. The top function of the call stack 404 is the last call that was made, before the stack crashed, and is therefore the crash point. The function 804 is a distance of seven (7) functions from the crash point. The distance of seven functions is the total of twelve functions, minus five immune functions. Accordingly, the alignment offset between the functions 802, 804 is one (1), i.e., the difference between the distance of eight associated with function 802 minus the distance of seven associated with function 804.

The call stack normalizer 810 is a length of the call stack 402. Such a factor can be used as one objective indicator of call stack similarity. A longer call stack normalizer tends to indicate that similarities in the call stacks are less likely to be coincidental. That is, a longer string of similarities is a stronger indication of similarity than a shorter string. In the example shown, the length of call stack 402 is 54 function calls.

Figure 9:
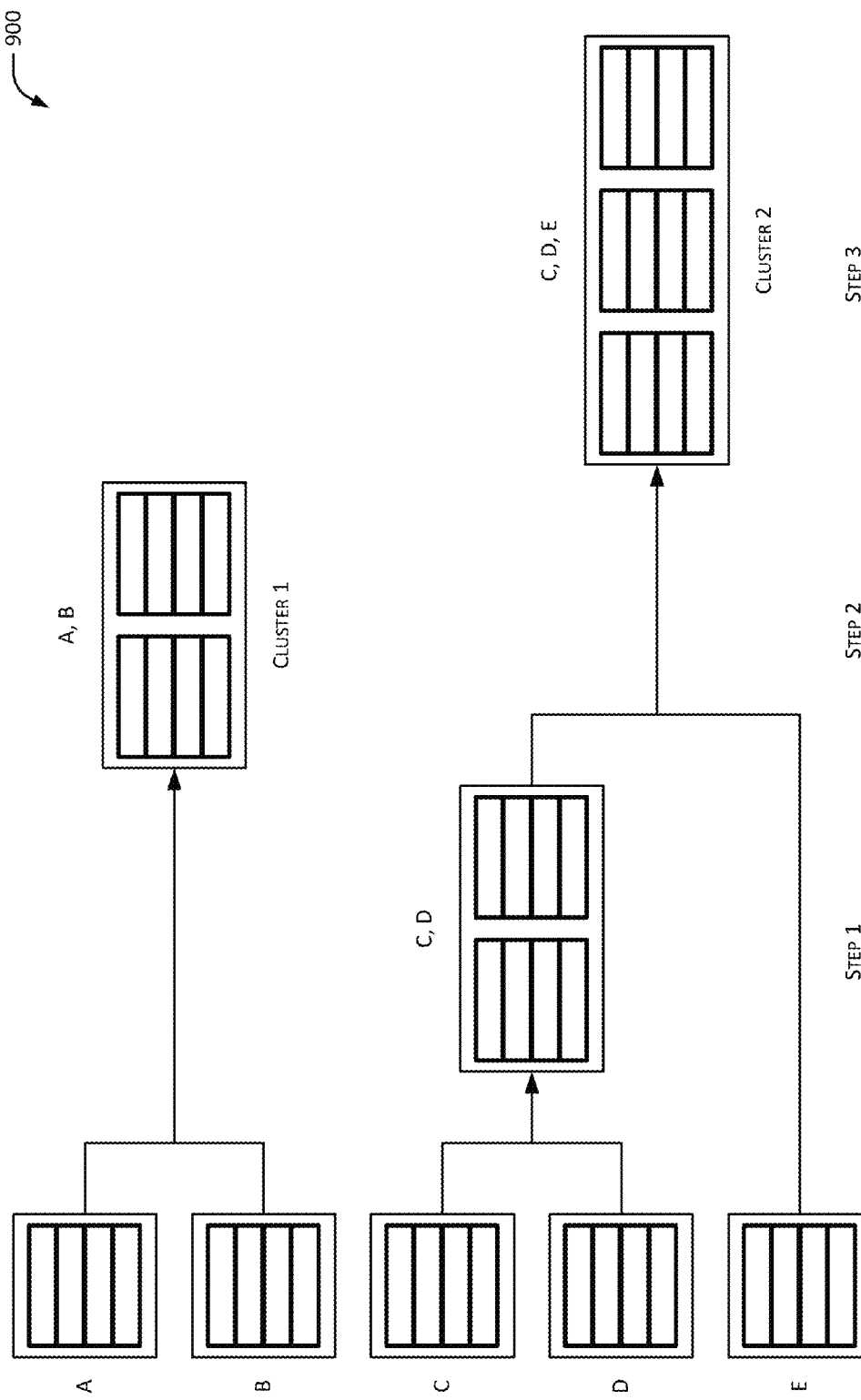
FIG. 9 is a diagram illustrating an example of hierarchical clustering of error reports based on call stack similarity.

FIG. 9 is a diagram 900 illustrating an example of hierarchical clustering of error reports based on call stack similarity. FIG. 9 shows five example error reports A through E, which are combined based on similarly of the call stacks within each error report. In Step 1, error reports C and D are combined. Error reports C and D were combined first because, in the example of FIG. 9, the call stacks in these two error reports are more similar than call stacks of any other combination of error reports. In Step 2, error reports A and B are combined. Because no further combination of these two error reports is indicated by the example of FIG. 9, error reports A and B constitute "Cluster 1." In Step 3, error report E is combined with error reports C and D, to form "Cluster 2." Accordingly, a plurality of error reports may be combined in a hierarchical manner, resulting in a plurality of clusters, each cluster including one or more error reports and all error reports within each cluster having call stacks that are more similar, by an objective measure, than a threshold value.

Example Techniques for Objective Call Stack Similarity Measurement

Two arbitrary call stacks (e.g., call stacks 402, 404 of FIG. 4) may be evaluated in an objective manner for similarity, according to the model of Equation (1).

$$sim(C_1, C_2) = \max_{S_1, S_2} \left[ \frac{\sum_{i=0}^{l} e^{-c \min(L_{1,i}, L_{2,i})} e^{-o|L_{2,i} - L_{1,i}|}}{f(sym(C_1(L_{1,i})), sym(C_2(L_{2,i})))}}{\sum_{i=0}^{l} e^{-ci}} \right] \quad \text{Equation (1)}$$

According to Equation (1), the similarity of any two error reports may be evaluated. Such an evaluation can be used, for example, to determine the appropriateness of including two error reports within a same meta-bucket or cluster. In particular, the evaluation may be made by examination of a similarity of the call stacks of the two error reports. Further, the similarity between call stacks $C_1$ and $C_2$ may be denoted by $sim(C_1, C_2)$. If $sim(C_1, C_2)$ is less than a value $\epsilon$, i.e., a threshold value, then the call stacks are sufficiently similar to warrant combination of the error reports into a meta-bucket or cluster (such as is indicated by FIGS. 2 and/or 9).

Referring to Equation (1), c is a coefficient for distance to crash point, o is a coefficient for alignment offset, $S_1$ and $S_2$ are any sub-sequences of $C_1$ and $C_2$, and l is a minimum of a length of $S_1$ and $S_2$, and $L_1$ and $L_2$ are lengths of $S_1$ and $S_2$, respectively. The range for c and o may be bounded by (0, 2), i.e., real numbers between zero and two. The terms c and o may initially be set by estimate, within this range. The range for $\epsilon$ may be bounded by (0, 1), and it may be similarly set by estimate to a real number within this range.

Equation (1) can be trained to provide more accurate clustering and/or meta-bucket creation by refinement of values for c, o and $\epsilon$. In one example, once the software error has been discovered (such as by software developers' work) some error reports and their associated call stacks will have been correctly grouped by Equation (1). Such correct grouping means that the grouped error reports were in fact related to the same error. Other error reports may have been incorrectly grouped. Such incorrect grouping means that the grouped error reports were not related to the same error. Once the software error is known, correct error report clustering will also be known. Using this information, the values for c, o and $\epsilon$ assigned to Equation (1) can be adjusted to result in greater accuracy in clustering error reports. The revised values for c, o and $\epsilon$ can then be used to cluster error reports going forward. The values for c, o and $\epsilon$ can be periodically revised, as desired.

Initially, Equation (1) is used with starting values of c, o and $\epsilon$, selected from within the approved ranges noted above. Error reports are clustered, such as into meta-buckets or in a hierarchical manner, when call stacks associated with the error reports are sufficiently similar, i.e., when $sim(C_1, C_2)$ of Equation (1) is less than $\epsilon$. After the error is resolved by software developers, it can be seen which error reports were correctly clustered as resulting from a same error. Equation (1) may then be trained to result in greater performance. In particular, the terms c, o and $\epsilon$ may be adjusted so that Equation (1) better recognizes call stack similarity and better combines error reports. That is, when the nature of the software error is known, the correct grouping of error reports is known. Accordingly, the terms c, o and $\epsilon$ may be adjusted so that Equation (1) indicates more call stack similarity in instances where the error reports should be combined and less call stack similarity when the error reports should not be combined. Such values of c, o and $\epsilon$ can be used going forward.

The learning process by which terms c, o and $\epsilon$ are adjusted to promote better operation of Equation (1) may involve use of Equation (2).

$$F1 = \frac{2pr}{p+r} \quad \text{Equation (2)}$$

Referring to Equation (2), the terms p and r may be considered to be a "precision" term and a "recall" term, respectively. The precision and recall terms may be obtained by examination of error reports that were grouped, after the error was discovered. The precision term is set as a quotient p=(number of pairs of call stacks calculated by Equation (1) to be similar that are also found to be actually similar after the error was discovered)/(number of call stacks calculated by Equation (1) to be similar). The recall term is set to be the quotient r=(number of pairs of call stacks calculated by Equation (1) to be similar that are also found to be actually similar after the error was discovered)/(number of call stacks found to be similar).

Using the values for p and r found after the software error is resolved, the value of F1 in Equation (2) may be found. By adjusting the values for c, o and $\epsilon$, Equation (1) will perform differently, resulting in new values for p, r, and F1. By selecting values for c, o and $\epsilon$ which maximize or increase F1, Equation (1) will more correctly group error reports by call stack similarity. Accordingly, the revised values for c, o and $\epsilon$ can be used going forward.

Any of several approaches may be employed to obtain values of c, o and $\epsilon$ that maximize or increase the function F1. A first approach to obtain values for of c, o and $\epsilon$ uses brute-force. In this approach, values of c, o and $\epsilon$ are sampled at intervals within their eligible ranges. Using a selected granularity (e.g., 0.1) all possible combinations of values of c, o and $\epsilon$ may be applied to Equation (1). The best combination of values of c, o and $\epsilon$ may be selected by comparing the F1 value obtained from each combination of the sampled values of c, o and $\epsilon$. For example, we may sample the value of c in interval [0, 2] with step 0.1, i.e., we enumerate the value of c as 0, 0.1, 0.2, . . . , 2. Values of o and $\epsilon$ may be similarly obtained, and c, o and $\epsilon$ combined in Equation (1) in all or many combinations. A second approach to optimize Equation (2) involves use of a gradient descent algorithm. For both approaches, the best and/or acceptable matches between the two call stacks may be obtained first by using a standard string searching and/or matching algorithm like the Knuth-Morris-Pratt algorithm.

Example Error Report Processing System

Figure 10:
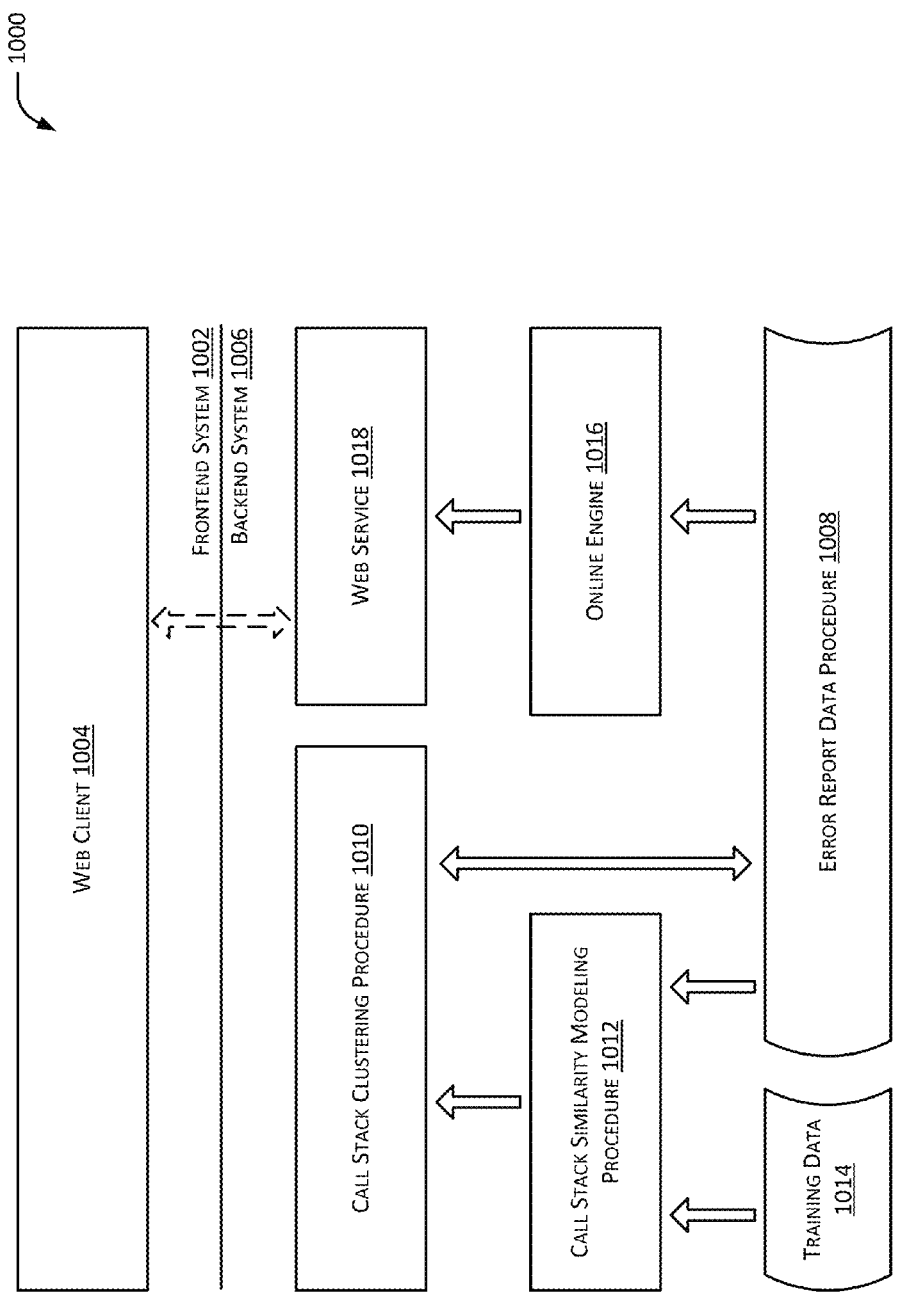
FIG. 10 is a diagram illustrating an example of a system for error report processing.

FIG. 10 is a diagram illustrating an example of a system 1000 for error report processing. In the example of FIG. 10, a front end system 1002 is configured to interface with a web client 1004. The front end system 1002 may provide web hosting functionality or other user interface support. The web client 1004 may be used by a software developer or other user, having a need for data related to software error reports. A backend system 1006 performs calculations and other functionality, particularly management of error reports and the clustering together of related error reports based on similarity of their call stacks.

An error report data procedure 1008 receives data, typically in the form of error reports. The error report data procedure 1008 is representative of data procedures generally, which receive data from systems (e.g., someone's computer anywhere on the Internet) after a software error or system crash. Such error reports may arrive from systems widely dispersed over the Internet or from local systems on an intranet. The error report data procedure 1008 may negotiate with a system having an error, to result in information transfer from the system. In some examples, such information may arrive at the error report data procedure 1008 in large quantities.

A call stack clustering procedure 1010 is configured for clustering error reports based on call stack similarity. Such clusters of error reports help to concentrate information related to a single software error (such as into one meta-bucket) and help to remove information related to unrelated software errors (which may be organized on other, appropriate meta-buckets). Error reports are received by the call stack clustering procedure 1010 from the error report data procedure 1008. Call stacks of each error report are examined, and those having sufficient similarity are grouped or clustered together, such as in a meta-bucket or other data structure. Accordingly, a plurality of meta-buckets may be created, thereby grouping related error reports.

The call stack clustering procedure 1010 may utilize the methods discussed with respect to FIGS. 1-9 to cluster error reports having appropriate levels of similarity, particularly based on call stack similarity. Accordingly, the call stack clustering procedure 1010 may utilize the model of Equation (1) and Equation (2) to cluster error reports based on a similarity of call stacks within the error reports. Such models may be instantiated and maintained within a call stack similarity modeling procedure 1012. In one example, the call stack similarity modeling procedure 1012 may maintain and update values for c, o and $\epsilon$, as discussed above. In particular, training data 1014 may be introduced to the call stack similarity modeling procedure 1012 to maintain, revise and train algorithms within the call stack similarity modeling procedure.

An online engine 1016 retrieves and manages error report data, such as meta-buckets created by the call stack clustering procedure 1010. This managed data is transmitted to the web service 1018, which provides a user interface of the backend system 1006, and provides web clients 1004 with data.

Figure 11:
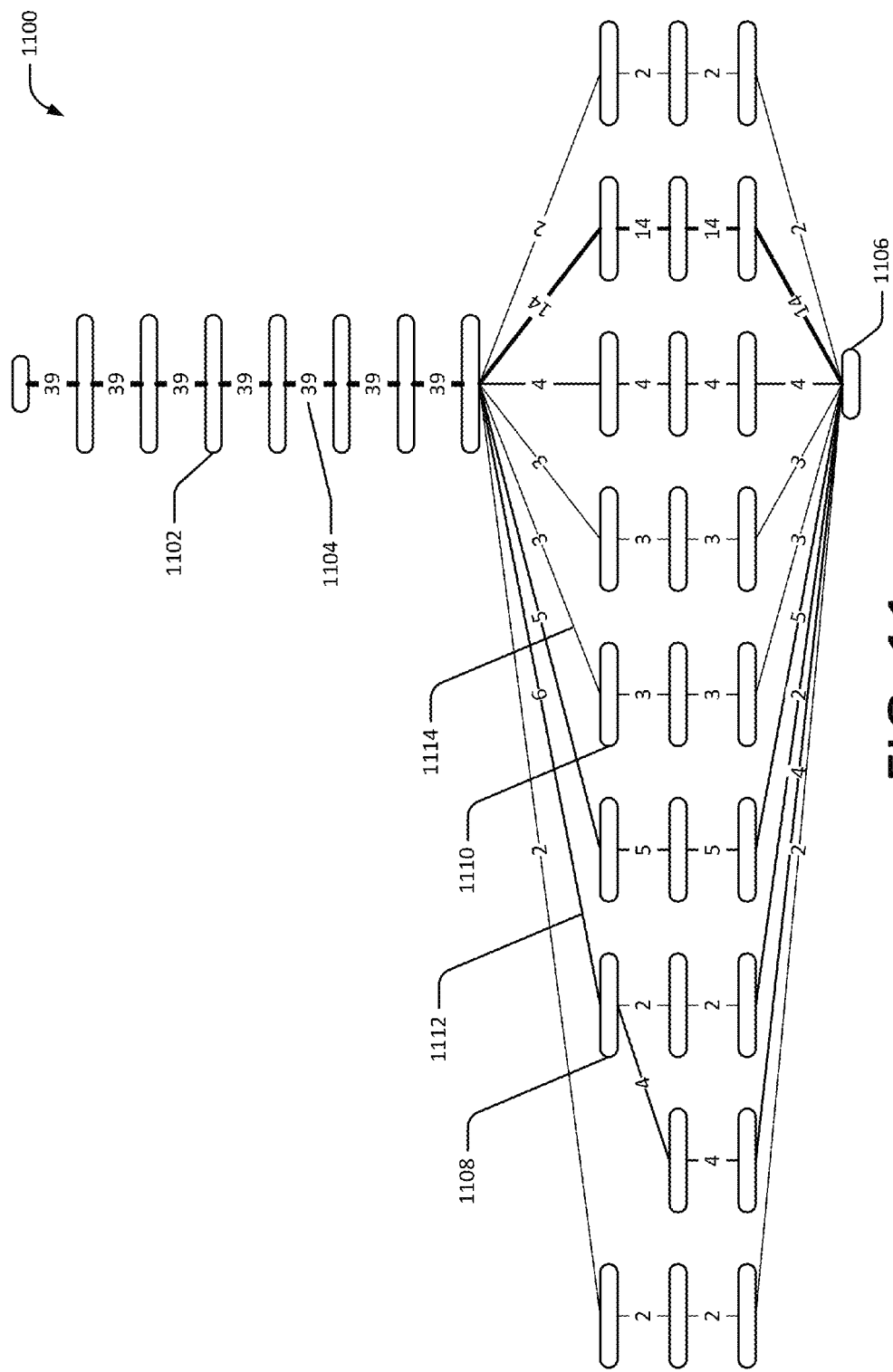
FIG. 11 is a directed graph illustrating an example of output of a system for error report processing.

FIG. 11 is a directed graph 1100 illustrating an example of output of the system 1000 for error report processing. The directed graph 1100 represents a plurality of call stacks from a plurality of related error reports. Accordingly, the directed graph 1100 shows similarities and differences in the operation of computers, having related error reports, prior to a crash. Such a directed graph could be provided to software development programmers and engineers working on error reports. By consulting the directed graph 1100, programmers will be able to gain additional understanding of what computers are doing prior to a crash.

The directed graph 1100 includes a number of nodes or representations 1102 of functions, procedures and/or subroutines that were present on a call stack of one or more error reports. A plurality of weighted vectors 1104 describe a plurality of different paths through the plurality of functions 1102 to a crash point 1106. Because the representations of the plurality of functions are organized in rows, a distance of each function from the crash point is shown. The distance to the crash point for any function can be measured in terms of a number of functions called after the function and before the crash point. The directed graph 1100 may be helpful to programmers looking for a reason for a software error or crash. In the example of FIG. 11, two representations 1108, 1110 indicate functions that are alternative to each other, in that some error reports the call stack includes function 1108, and in other error report the call stack includes function 1110. Function 1108 is associated with six error reports, while function 1110 is associated with three error reports. Thus, a weighted vector 1112 indicates that in call stacks associated with six (6) error reports the function 1108 was called. Similarly, a weighted vector 1114 indicates that in call stacks associated with three (3) error reports the function 1110 was called. In thirty-nine (39) instances the crash occurred at a function indicated as the crash point 1106. However, the crash may not be the fault of the function 1106, since the failures (e.g., writing data to wrong areas of memory) of other functions may have caused the crash during the operation of function 1106. Accordingly, the directed graph 1100 provides engineers and programmers with information derived from error reports having call stacks thought to be related to a same software error.

Example Flow Diagrams

FIGS. 12-15 are flow diagrams illustrating example processes for error report processing. The example processes of FIGS. 12-15 can be understood in part by reference to the configurations of FIGS. 1-11. However, FIGS. 12-15 contain general applicability, and are not limited by other drawing figures and/or prior discussion.

Figure 12:
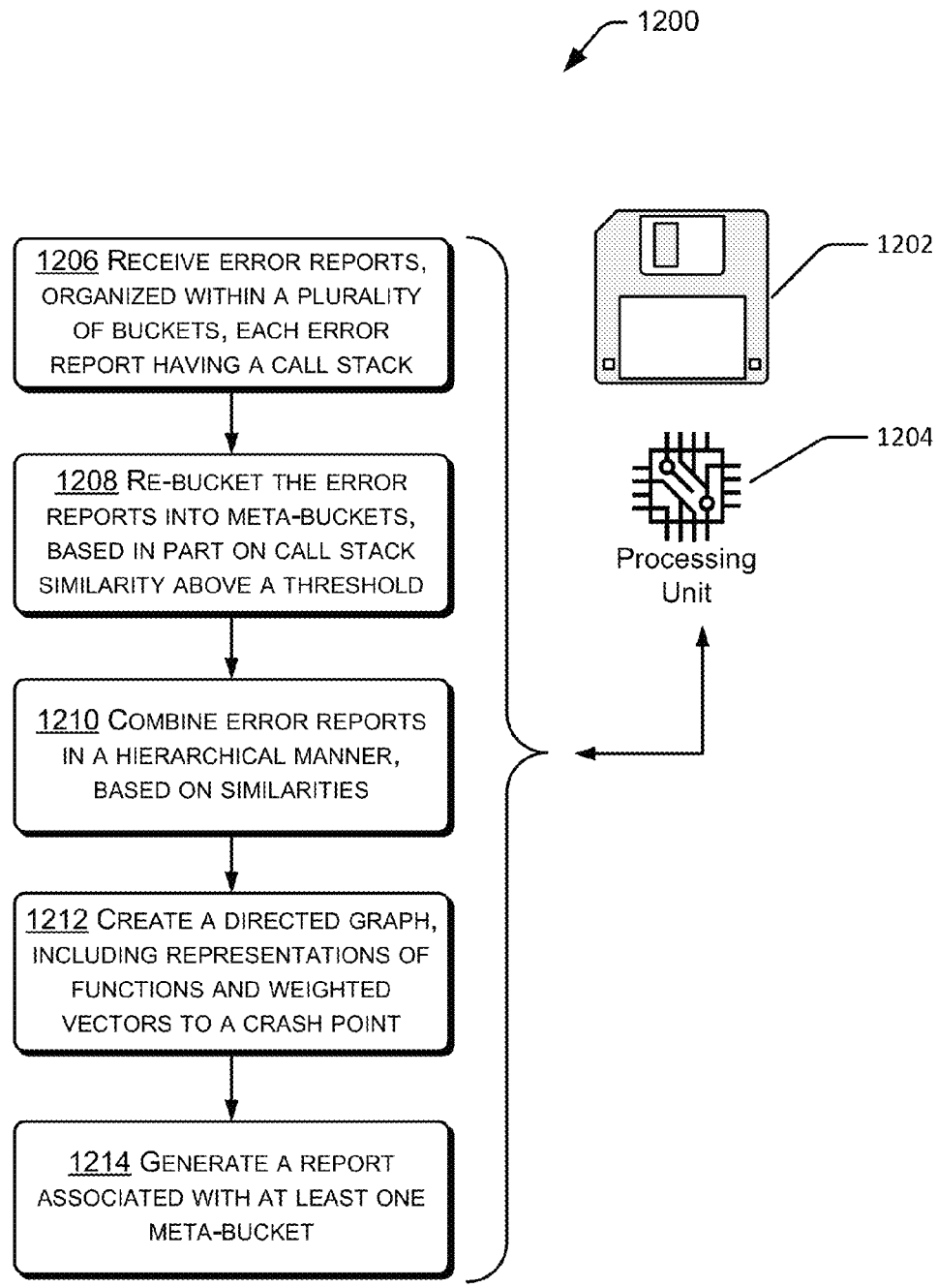
FIGS. 12-15 are flow diagrams illustrating example processes by which error reports may be processed.

Each process described herein is illustrated as a collection of blocks or operations in a logical flow graph, which represent a sequence of operations that can be implemented in hardware, software, or a combination thereof. In the context of software, the operations represent computer-executable instructions stored on one or more computer-readable storage media 1202 that, when executed by one or more processors 1204, perform the recited operations. Such storage media 1202, processors 1204 and computer-readable instructions can be located within an error report processing system (e.g., system 1000 of FIG. 10) according to a desired design or implementation. More particularly, the storage media, processors and computer-readable instructions can be located within the call stack clustering procedure 1010 and/or the call stack similarity modeling procedure 1012 of FIG. 10. The storage media 1202 seen in FIG. 12 is representative of storage media generally, both removable and non-removable, and of any technology. Thus, the recited operations represent actions, such as those described in FIGS. 12-15, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The above discussion may apply to other processes described herein.

FIG. 12 is a flow diagram illustrating an example process by which error reports may be processed. At operation 1206, error reports are received and organized within a plurality of buckets. The organization may be based on a name of the procedure within which a software error or crash has happened. In one example, each error report includes a call stack of the computer on which the error occurred. In the example of FIG. 2, bucket 206 is representative of buckets receiving error reports, the error reports possibly including a name and version of a procedure within which a crash occurred. The error report may also include a call stack.

At operation 1208, the error reports are re-bucketed. The re-bucketing may be based on call stack similarity, indicating that a similarity of call stacks of two error reports is great enough, or that a difference between them is small enough, to warrant clustering or re-bucketing of the error reports. Referring to the example of FIG. 2, an example of re-bucketing is seen. In one particular example, some or all of the error reports from buckets 216-220 are re-bucketed into a meta-bucket 222. The error reports re-bucketed into the meta-bucket 222 include error reports having call stacks that are sufficiently similar.

At operation 1210, error reports may optionally be combined in a hierarchical manner, based on similarities of the error reports. In the example of FIG. 9, if call stacks associated with each error report are sufficiently similar, then the error reports are combined in a hierarchical manner.

At operation 1212, a directed graph is created, including representations of functions and weighted vectors leading to a crash point (a function within which the crash occurred). In the example of FIG. 11, the directed graph illustrates a combination of a thirty-nine error reports, showing various paths followed that ended at the crash point.

At operation 1214, a report is generated, indicating aspects of error report processing. In one example, the error report includes the directed graph obtained at operation 1212. Alternatively, report information may be presented in an alternative format.

Figure 13:
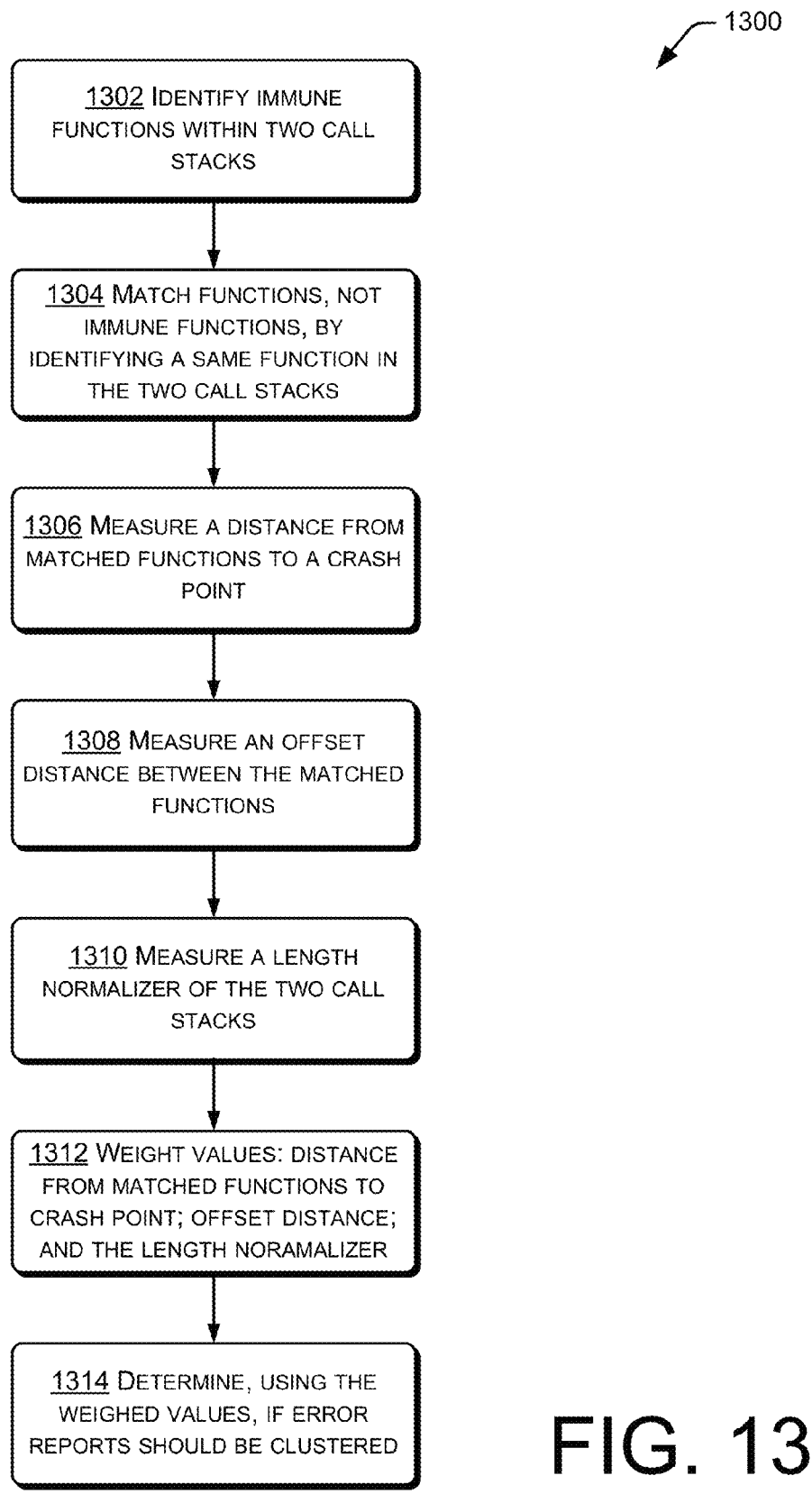

FIG. 13 is a flow diagram illustrating an example process by which call stack similarity is measured. In one example, the similarity of two call stacks is measured to determine if the error reports, from which the call stacks were obtained, should be combined or associated. At operation 1302, immune functions are identified within call stacks. Generally, errors occurring within immune functions are not blamed on the immune function. Accordingly, removal of immune functions tends to simplify the process of measuring call stack similarity. An example of immune function identification is seen at FIG. 5.

At operation 1304, functions which are not immune functions are matched. For example, the matching may involve identifying a same function in each of the two call stacks, wherein each call stack is associated with a different error report. A further example of matching non-immune functions is seen in FIG. 6. The more matched functions found in the examination of two call stacks, the more similarity exists between the call stacks.

At operation 1306, a distance is measured from matched functions to a crash point. An example of this operation is seen at FIG. 7. In some cases, the matched functions are a same distance from the crash point. However, the distance may not be the same, and may therefore include an offset distance. At operation 1308, an offset distance between two matched functions is measured. Such a measurement is seen in the example of FIG. 8.

At operation 1310, a length normalizer is measured. In the example of FIG. 8, the normalizer can be a length of the shorter call stack. Alternatively, the normalizer can be the length of the longer call stack. The length normalizer can be a number of functions in the measured call stack. The normalizer is significant because it is more likely that error reports should be combined if they are associated with a longer normalizer.

At operation 1312, a number of values may be weighted, to determine similarity of the call stacks. In one example the following factors can be weighted: the distance of matched functions to a crash site; the offset distance between the various matched functions; and the length normalizer.

At operation 1314, values are used (e.g., the weighted values of operation 1312) to determine if error reports (e.g., two error reports) should be clustered, based on a similarity of their respective call stacks. In an alternative example wherein Equation (1) is utilized, the similarity may be compared to a threshold value, such as $\epsilon$.

Figure 14:
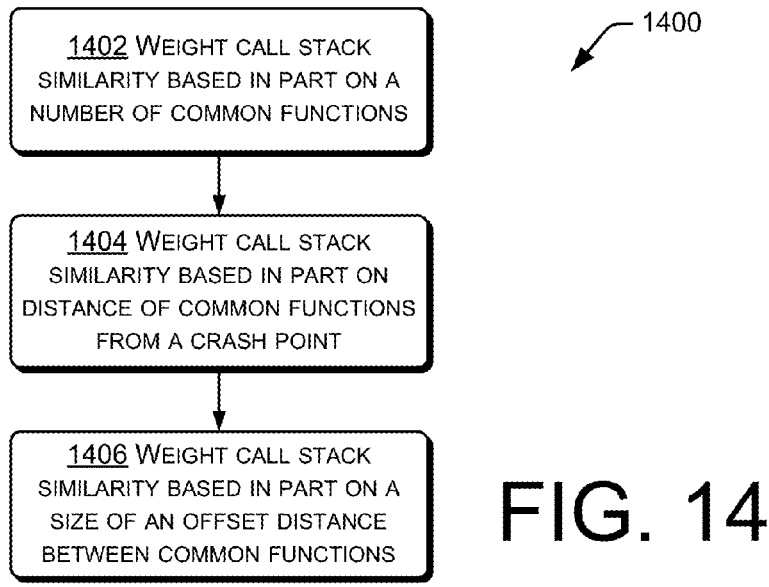

FIG. 14 is a flow diagram illustrating an example by which call stack similarity can be weighted, and can be considered an expansion of the discussion of operation 1312 of FIG. 13. At operation 1402, call stack similarity based in part on a number of common functions is weighted. As seen in FIG. 6, immune functions are typically removed, before common functions are determined.

At operation 1404, call stack similarity based in part on distances of common functions from a crash point is weighted. As seen in FIG. 8, a number of common functions may exist between two call stacks, resulting in a number of measured distances.

At operation 1406, call stack similarity based in part on an offset distance, measured between common functions, is weighted. As seen in FIG. 8, differences in the alignment of a number of common functions results in a number of measured offset distances.

Figure 15:
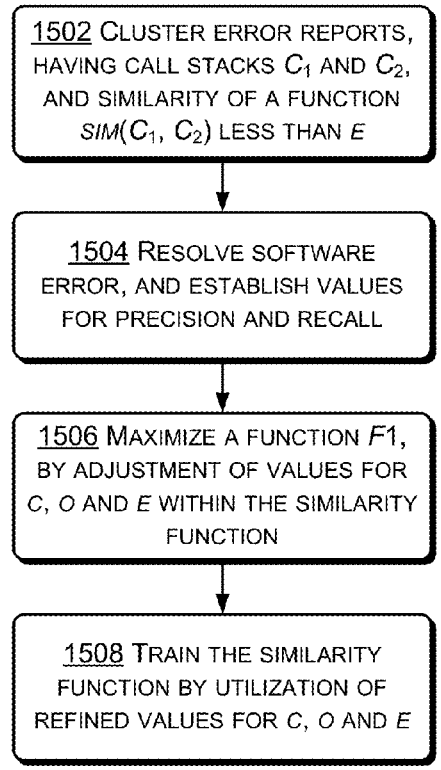

FIG. 15 is a flow diagram illustrating an example by which a function configured to objectively measure call stack similarity can be trained, and particularly how parameters used in such a function can be refined. At operation 1502, error reports are clustered by operation of a function configured to measure similarity of call stacks associated with the error reports. An example of such a clustering of error reports is seen by the operation of Equation (1), above. Initially, values for c, o and $\epsilon$ may be set by estimation and/or experience.

At operation 1504, the software error which caused the error reports is resolved, such as by efforts of engineers and programmers. Because the cause of the error reports is known, the clustering performed at operation 1502 can be evaluated for correctness. This allows values for precision and recall to be established.

At operation 1506, Equation (2) can be maximized or increased by adjustment of the values for c, o and $\epsilon$, and reevaluation of Equation (1). In some instances, the initial values for c, o and $\epsilon$ will be adequate. Typically, new values for c, o and $\epsilon$ will be obtained.

At operation 1508, the new values for c, o and $\epsilon$ may be substituted into Equation (1), thereby improving its performance in future use.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
   one or more processors;
   one or more computer-readable media storing computer-executable instructions that, when executed, configure the one or more processors to perform acts comprising:
      receiving error reports, the error reports organized within a plurality of buckets, the buckets based in part on an application name associated with a crash, individual ones of the error reports having a call stack, individual call stacks having a plurality of functions;
      identifying one or more immune functions in the call stack;
      comparing at least one function of the plurality of functions in the first call stack with at least one function of the plurality of functions in a second call stack;
      removing the one or more immune functions from the comparing the at least one function of the plurality of functions in the first call stack with the at least one function of the plurality of functions in the second call stack;

based at least in part on the comparing, identifying one or more matched functions that is in the first call stack and the second call stack;

measuring a call stack similarity between the first call stack and the second call stack based at least in part on the one or more matched functions;

re-bucketing the error reports into meta-buckets, the re-bucketing based in part on the measuring the call stack similarity, to thereby associate in each meta-bucket a plurality of error reports having call stacks having a similarity that is greater than a threshold value; and generating a report associated with at least one meta-bucket.

2. The device as claim 1 recites, the measuring the call stack similarity comprising:

aligning the one or more matched functions; and calculating an offset, the offset being a distance between the one or more matched functions and a crash procedure, wherein the call stack similarity is based at least in part on the offset.

3. The device as claim 1 recites, the measuring the call stack similarity comprising:

measuring a first distance between the one or more matched functions and a first crash procedure in a first call stack;

measuring a second distance between the one or more matched functions and a second crash procedure in a second call stack; and calculating an offset by subtracting the first distance from the second distance, wherein the call stack similarity is based at least in part on the offset.

4. The device as claim 1 recites, the measuring the call stack similarity comprising:

measuring a length normalizer of the first call stack and a length normalizer of the second call stack, the length normalizer being a number of functions in the respective call stack, wherein the call stack similarity is based at least in part on the length normalizer of the first call stack and the length normalizer of the second call stack.

5. The device as claim 1 recites, the acts further comprising organizing the error reports based at least in part on a version of an application associated with the crash.

6. The device as claim 1 recites, the acts further comprising:

evaluating the call stack similarity by a similarity function; and training the similarity function by refinement of values used in the similarity function.

7. A method comprising:

receiving error reports, the error reports organized within a plurality of buckets, the buckets based in part on an application name associated with a crash, individual ones of the error reports having a call stack, individual call stacks having a plurality of functions;

identifying one or more immune functions in the call stack;

comparing at least one function of the plurality of functions in the first call stack with at least one function of the plurality of functions in a second call stack;

removing the one or more immune functions from the comparing the at least one function of the plurality of functions in the first call stack with the at least one function of the plurality of functions in the second call stack;

based at least in part on the comparing, identifying one or more matched functions that is in the first call stack and the second call stack;

measuring a call stack similarity between the first call stack and the second call stack based at least in part on the one or more matched functions;

re-bucketing the error reports into meta-buckets, the re-bucketing based in part on the measuring the call stack similarity; and generating a report associated with at least one meta-bucket.

8. The method as claim 7 recites, wherein the re-bucketing is based on the call stacks of the individual ones of the error reports having a similarity that is greater than a threshold value.

9. The method as claim 7 recites, wherein the measuring the call stack similarity comprises:

determining respective positions of the one or more matched functions in the first call stack and the second call stack, wherein the call stack similarity increases responsive to the respective positions of the one or more matched functions in the first call stack and the second call stack matching.

10. The method as claim 7 recites, wherein the measuring the call stack similarity comprises:

measuring a first distance between the one or more matched functions and a first crash procedure in a first call stack;

measuring a second distance between the one or more matched functions and a second crash procedure in a second call stack; and calculating an offset by subtracting the first distance from the second distance, wherein the call stack similarity is based at least in part on the offset.

11. The method as claim 7 recites, wherein the measuring the call stack similarity comprises:

aligning the one or more matched functions; and calculating an offset, the offset being a distance between the one or more matched functions and a crash procedure, wherein the call stack similarity is based at least in part on the offset.

12. The method as claim 7 recites, further comprising organizing the error reports based at least in part on a version of an application associated with the crash.

13. A system comprising:

one or more processors;

one or more computer-readable storage devices storing computer-executable instructions that, when executed, cause the one or more processors to perform acts comprising:

receiving error reports, the error reports organized within a plurality of buckets, the buckets based in part on an application name associated with a crash, individual ones of the error reports having a call stack, individual call stacks having a plurality of functions;

identifying one or more immune functions in the call stack;

comparing at least one function of the plurality of functions in the first call stack with at least one function of the plurality of functions in a second call stack;

removing the one or more immune functions from the comparing the at least one function of the plurality of functions in the first call stack with the at least one function of the plurality of functions in the second call stack;

based at least in part on the comparing, identifying one or more matched functions that is in the first call stack and the second call stack;

measuring a call stack similarity between the first call stack and the second call stack based at least in part on the one or more matched functions;

re-bucketing the error reports into meta-buckets, the re-bucketing based in part on the measuring the call stack similarity; and generating a report associated with at least one meta-bucket.

14. The system as claim 13 recites, the acts further comprising organizing the error reports based at least in part on a version of an application associated with the crash.

15. The system as claim 13 recites, wherein the measuring the call stack similarity comprises:

measuring a length normalizer of the first call stack and a length normalizer of the second call stack, the length normalizer being a number of functions in the respective call stack, wherein the call stack similarity is based at least in part on the length normalizer of the first call stack and the length normalizer of the second call stack.

16. The system as claim 13 recites, wherein the measuring the call stack similarity comprises:

determining respective positions of the one or more matched functions in the first call stack and the second call stack, wherein the call stack similarity increases responsive to the respective positions of the one or more matched functions in the first call stack and the second call stack matching.

17. The system as claim 13 recites, wherein the measuring the call stack similarity comprises:

measuring a first distance between the one or more matched functions and a first crash procedure in a first call stack;

measuring a second distance between the one or more matched functions and a second crash procedure in a second call stack; and calculating an offset by subtracting the first distance from the second distance, wherein the call stack similarity is based at least in part on the offset.

18. The system as claim 13 recites, wherein the measuring the call stack similarity comprises:

aligning the one or more matched functions; and calculating an offset, the offset being a distance between the one or more matched functions and a crash procedure, wherein the call stack similarity is based at least in part on the offset.

19. A system comprising:

one or more processors;

one or more computer-readable storage devices storing computer-executable instructions that, when executed, cause the one or more processors to perform acts comprising:

receiving error reports, the error reports organized within a plurality of buckets, the buckets based in part on an application name associated with a crash, individual ones of the error reports having a call stack, individual call stacks having a plurality of functions;

comparing at least one function of the plurality of functions in the first call stack with at least one function of the plurality of functions in a second call stack;

based at least in part on the comparing, identifying one or more matched functions that is in the first call stack and the second call stack;

measuring a call stack similarity between the first call stack and the second call stack based at least in part on the one or more matched functions, wherein the measuring the call stack similarity comprises:

aligning the matched functions; and calculating an offset, the offset being a distance between the matched functions and a crash procedure, wherein the call stack similarity is based at least in part on the offset;

re-bucketing the error reports into meta-buckets, the re-bucketing based in part on the measuring the call stack similarity; and generating a report associated with at least one meta-bucket.

20. The system as claim 19 recites, the acts further comprising organizing the error reports based at least in part on a version of an application associated with the crash.

21. A method comprising:

receiving error reports, the error reports organized within a plurality of buckets, the buckets based in part on an application name associated with a crash, individual ones of the error reports having a call stack, individual call stacks having a plurality of functions;

comparing at least one function of the plurality of functions in the first call stack with at least one function of the plurality of functions in a second call stack;

based at least in part on the comparing, identifying one or more matched functions that is in the first call stack and the second call stack;

measuring a call stack similarity between the first call stack and the second call stack based at least in part on the one or more matched functions, wherein the measuring the call stack similarity comprises:

measuring a first distance between the one or more matched functions and a first crash procedure in a first call stack;

measuring a second distance between the matched function and a second crash procedure in a second call stack; and calculating an offset by subtracting the first distance from the second distance, wherein the call stack similarity is based at least in part on the offset;

re-bucketing the error reports into meta-buckets, the re-bucketing based in part on the measuring the call stack similarity; and generating a report associated with at least one meta-bucket.

22. The method as claim 21 recites, further comprising organizing the error reports based at least in part on a version of an application associated with the crash.

* * * * *